Jan. 12, 1943.　　T. E. CRAVENS　　2,308,269
VALVE
Filed Feb. 11, 1942　　2 Sheets-Sheet 1
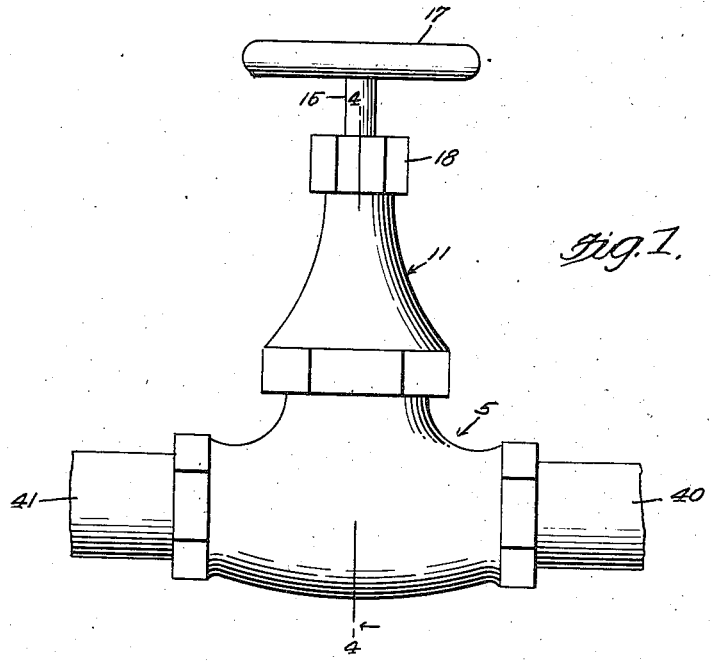
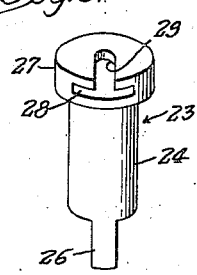
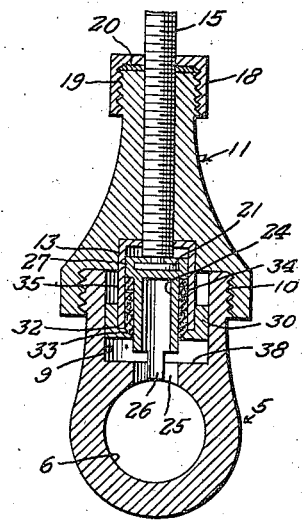
Inventor.
Thomas E. Cravens Jan. 12, 1943.   T. E. CRAVENS   2,308,269
VALVE
Filed Feb. 11, 1942   2 Sheets-Sheet 2

Inventor
Thomas E. Cravens

By Clarence A. O'Brien
and Harvey B. Jacobson
Attorneys

Patented Jan. 12, 1943

2,308,269

UNITED STATES PATENT OFFICE 2,308,269

VALVE

Thomas E. Cravens, Kerrville, Tex.

Application February 11, 1942, Serial No. 430,455

2 Claims. (Cl. 251—43)

The invention relates to improvements in globe valves, and the primary object of the invention is to provide a more efficient, long-lasting, and fluid-tight valve of this character requiring a minimum amount of expensive materials.

Other important objects and advantages of the invention will be apparent from a reading of the following description taken in connection with the appended drawings, wherein for purposes of illustration I have shown a preferred embodiment of the invention.

In the drawings:

Figure 1 is a general side elevational view.

Figure 4 is a transverse vertical sectional view taken through Figure 1 along the line 4—4 and looking toward the left in the direction of the arrow.

Figure 5 is a perspective view of the core.

Figure 3:
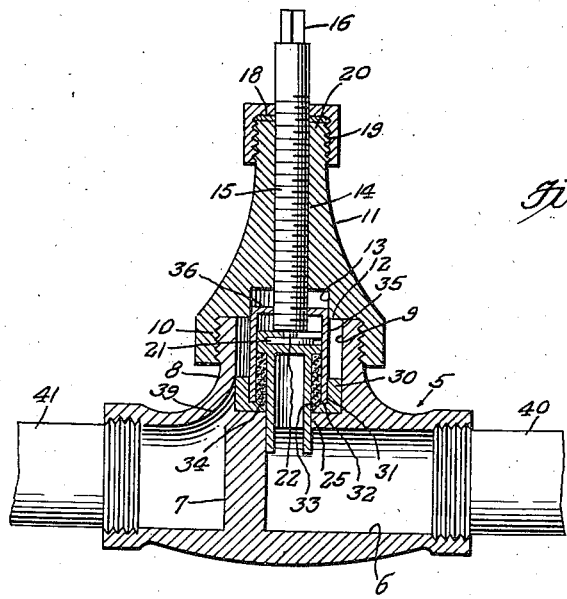
Figure 3 is a longitudinal vertical cross sectional view taken along the line 3—3 of Figure 2 and looking upwardly in the direction of the arrow.
Figure 2:
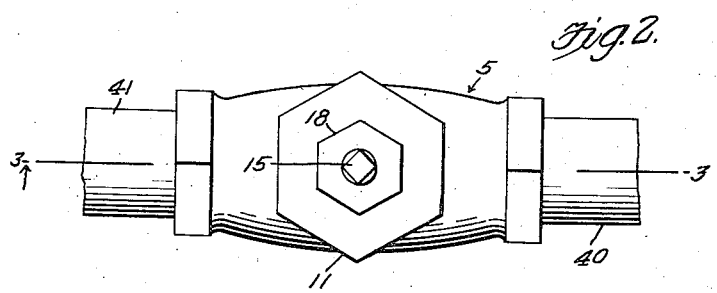
Figure 2 is a top plan view with the hand wheel removed.
Figure 6:
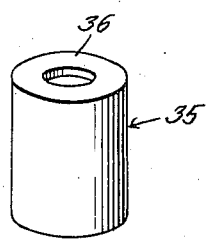
Figure 6 is a perspective view of the cylinder.

Referring in detail to the drawings, the numeral 5 generally designates the body of the valve which has a substantially uniform longitudinal cylindrical bore 6 which at approximately a two-thirds distance from one end is formed with a heavy wall 7 which extends entirely across the bore 6. One side of the body 5 has a tubular extension 8 which is formed with a substantially uniform bore 9 extending at right angles to the bore 6. The outer end of the extension 8 is threaded at 10 to mount the valve stem fitting 11 which has an interior shoulder 12 which abuts the outer end of the extension 8 and projects radially inwardly beyond the sides of the bore 9 as indicated in Figures 3 and 4 of the drawings. A smaller diameter concentric bore 13 is formed in the fitting 11 and extends radially outwardly with respect to the body 5, beyond the shoulder 12. The fitting 11 is provided with a threaded bore 14 in which is threaded the valve stem 15 whose outer end is squared as indicated by the numeral 16 to accommodate the hand wheel 17. The outer portion of the valve stem passes through an opening in a cap 18 which is threaded as indicated by the numeral 19 on the outer end of the fitting 11 and encloses and compresses a packing 20 against the valve stem and the outer end of the fitting 11.

The inner end of the valve stem 15 has a flat plain disk 21 concentrically connected to the inner end of the valve stem by a small diameter shank 22, whereby an annular slot is defined between the disk and the valve stem.

The valve core which is generally designated 23 consists of a hollow cylinder 24 of an outside diameter to have a close sliding fit in the circular opening 25 which is formed in the side wall of the valve body 5 in axial alignment with the extension bore 9 and next to the adjacent side of the partition 7. The lower open end of the cylinder 24 has a pair of diametrically spaced depending fingers 26 which in the extreme opened position of the valve remain in the opening 25 as indicated in Figure 4 of the drawings to keep the valve core centered and in working relation to the opening 25. The upper end of the valve core is closed by a cylindrical head 27 which is larger in diameter than the cylinder 24 and is formed in one side with a circumferential slot 28 just wide enough to pass the disk 21 on the lower end of the valve stem, a diametrical slot 29 opening into the slot 28 from a point above it and opening through the top of the head 27 to accommodate the shank 22, so that the valve core and the valve stem can be removably assembled in axial alignment and be operatively connected.

A ring 30 having a closer sliding fit in the extension bore 9 has its inner side cut away at 31 to define a right angular shoulder 32 which extends around the ring, and this shoulder has its radially inward part beveled as indicated by the numeral 33 to provide a seat for the cylindrical packing 34 which is circumposed on the exterior of the cylinder portion 24 of the valve core 23 and has the lower side of the head 27 abutted with the adjacent end of the packing, the opposite end of the packing being beveled to conform with the beveled seat 33.

Between the packing 34 and the inner side of the ring 30 and suitably secured to the ring is located the outer hollow cylinder 35 which has its open lower end resting on the right angular shoulder 32 and its closed upper end 36 spaced above the head 27 of the valve core as indicated in Figures 3 and 4 of the drawings. The outside diameter of the outer cylinder 35 makes a sliding close fit in the reduced bore 13 in the fitting 11. The valve stem 15 turns freely in a conforming opening in the top 36 of the outer cylinder 35.

With the valve assembly in the extreme open position shown in Figure 4 of the drawings, the valve is closed by turning the valve stem 15 downwardly, thereby forcing the valve core 23 downwardly. This exerts pressure on the upper end of the packing 34 which, in turn, exerts pressure on the ring 30, thereby carrying these parts downwardly toward the extreme closed position shown in Figure 3 of the drawings. The expansion of the packing 34 exerts pressure in a radially outward direction, thereby anchoring the outer cylinder 35 to the ring 30 and thereby causing the outer cylinder to follow the parts mentioned. As the ring 30 reaches the inner end of the extension bore 9 and abuts the squared bottom 38 of such bore, the cylinder 24 of the valve core is operatively seated in the opening 25. With the parts in these positions the laterally outwardly curved passage 39 affording communication between the extension bore 9 and the bore 6 at the left hand side of the partition 7, is closed off and flow of fluid between the inlet and outlet pipes 40 and 41 connected to the opposite ends of the body 5 is positively prevented. Operation of the valve stem 15 in the opposite direction will restore the valve core to the open position. The head 27 will pick up the cylinder 35 and restore the same to open position together with the ring 30 which will lift the packing 34 therewith.

Although there is shown and described herein a preferred embodiment of the invention, it is to be understood that the invention is not to be limited thereto except as may be required by the scope of the subjoined claims.

Having described the invention, what is claimed as new is:

1. A valve comprising a tubular body including a lateral tubular extension communicating with the bore of said body through a valve opening formed in the wall of said body in axial alignment with the bore of said tubular extension, a partition closing off the bore of said body at one side of said valve opening, a passage formed in the side wall of said body at the side of said partition remote from said valve opening and establishing communication between the bore of the extension and the bore of said body at the remote side of said partition, a valve stem fitting on said tubular extension, a valve stem threaded in said fitting in axial alignment with said valve opening, and a valve assembly secured to the inner end of said valve stem, said assembly being adjustable when the valve stem is operated in different directions to open and close said valve opening and said passage, the outside surface of the side wall of said body around said valve opening being substantially plane, and said valve assembly comprising a ring slidable in the bore of said extension and formed with a plane surface to abut the mentioned plane surface in the closed position of said assembly, said ring having a radially inwardly projecting beveled annular portion on its inner wall, a hollow cylindrical core extending through the opening of said ring and arranged to enter and close said valve opening, an enlarged head on the outer end of said core, a hollow cylindrical packing telescoped over said core and having its inner end beveled to conformably engage said beveled annular portion of said ring with the outer end of said packing abutting the inner side of said enlarged head, an outer hollow cylinder telescoped upon said packing and engaging the inner wall of said ring, and means revolubly connecting the inner end of said valve stem with the enlarged head on said core.

2. A valve comprising a tubular body including a lateral tubular extension communicating with the bore of said body through a valve opening formed in the wall of said body in axial alignment with the bore of said tubular extension, a partition closing off the bore of said body at one side of said valve opening, a passage formed in the side wall of said body at the side of said partition remote from said valve opening and establishing communication between the bore of the extension and the bore of said body at the remote side of said partition, a valve stem fitting on said tubular extension, a valve stem threaded in said fitting in axial alignment with said valve opening, and a valve assembly secured to the inner end of said valve stem, said assembly being adjustable when the valve stem is operated in different directions to open and close said valve opening and said passage, the outside surface of the side wall of said body around said valve opening being substantially plane, and said valve assembly comprising a ring slidable in the bore of said extension and formed with a plane surface to abut the mentioned plane surface in the closed position of said assembly, said ring having a radially inwardly projecting beveled annular portion on its inner wall, a hollow cylindrical core extending through the opening of said ring and arranged to enter and close said valve opening, an enlarged head on the outer end of said core, a hollow cylindrical packing telescoped over said core and having its inner end beveled to conformably engage said beveled annular portion of said ring with the outer end of said packing abutting the inner side of said enlarged head, an outer hollow cylinder telescoped on said packing and engaging the inner wall of said ring, and means revolubly connecting the inner end of said valve stem with the enlarged head on said core, the inner end of said core being open and provided with circumferentially spaced guide fingers slidably engaging the sides of said valve opening in open positions of said assembly.

THOMAS E. CRAVENS.